US007814523B2

(12) United States Patent
Fellenstein et al.

(10) Patent No.: US 7,814,523 B2
(45) Date of Patent: Oct. 12, 2010

(54) APPARATUS AND METHOD FOR TELEVISION VIEWER INTEREST EXPRESSION IN ADVERTISER GOODS AND SERVICES

(75) Inventors: Craig William Fellenstein, Brookfield, CT (US); Doreen Lynn Galli, Smyrna, GA (US); Rick Allen Hamilton, II, Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 1397 days.

(21) Appl. No.: 10/392,683

(22) Filed: Mar. 19, 2003

(65) Prior Publication Data

US 2004/0187158 A1 Sep. 23, 2004

(51) Int. Cl.
*H04H 20/14* (2008.01)
*H04H 60/29* (2008.01)
*H04H 60/33* (2008.01)
*H04N 7/16* (2006.01)
*H04N 7/173* (2006.01)

(52) U.S. Cl. .................... 725/110; 725/13; 725/22; 725/105; 725/115; 725/136

(58) Field of Classification Search .................. 725/22, 725/42, 60, 109, 23, 34, 35, 61; 705/14, 705/26, 27
See application file for complete search history.

(56) References Cited

U.S. PATENT DOCUMENTS

| 5,027,400 | A | * | 6/1991 | Baji et al. ............... 725/116 |
| 5,438,355 | A | * | 8/1995 | Palmer ................... 725/110 |
| 5,708,478 | A | * | 1/1998 | Tognazzini ............. 348/552 |
| 5,774,534 | A | | 6/1998 | Mayer ................... 379/142 |
| 5,907,322 | A | * | 5/1999 | Kelly et al. ............... 725/51 |
| 6,178,446 | B1 | | 1/2001 | Gerszberg et al. ....... 709/217 |
| 7,185,355 | B1 | * | 2/2007 | Ellis et al. ............... 725/46 |
| 2001/0032333 | A1 | | 10/2001 | Flickinger ............... 725/39 |
| 2001/0047264 | A1 | * | 11/2001 | Roundtree ............... 704/275 |
| 2002/0032906 | A1 | * | 3/2002 | Grossman ............... 725/42 |

(Continued)

FOREIGN PATENT DOCUMENTS

EP    1 071 287 A2    1/2001

(Continued)

*Primary Examiner*—Dominic D Saltarelli
(74) *Attorney, Agent, or Firm*—Yee & Associates, P.C.; William H. Steinberg; Rudolf O. Siegesmund

(57) ABSTRACT

A method for allowing television viewers to express their interest in goods or services advertised on television. The present invention is comprised of a Viewer Preference Program, a Viewer Interest Program, and a Viewer Expression Program. The Viewer Expression Program interfaces with the viewer database, the advertiser database, and the cable provider program and runs the cable provider program, the Viewer Preference Program, and the Viewer Interest Program. The Viewer Preference Program allows the viewer to input the method by which he/she desires to be contacted and the type of information he/she desires to receive from the advertiser. The viewer may indicate an interest during any commercial or program and the Viewer Interest Program records the time and channel of interest. The Viewer Interest Program then cross-references the advertisement with the advertiser responsible for the advertisement and sends the requested information to the viewer.

5 Claims, 2 Drawing Sheets

U.S. PATENT DOCUMENTS

| | | | |
|---|---|---|---|
| 2002/0124249 A1* | 9/2002 | Shintani et al. | 725/32 |
| 2002/0179703 A1* | 12/2002 | Allen | 235/381 |
| 2003/0014754 A1* | 1/2003 | Chang | 725/60 |
| 2003/0028883 A1* | 2/2003 | Billmaier et al. | 725/46 |
| 2005/0216936 A1* | 9/2005 | Knudson et al. | 725/42 |

FOREIGN PATENT DOCUMENTS

| | | |
|---|---|---|
| EP | 1 071 287 A3 | 3/2001 |

* cited by examiner

US 7,814,523 B2

APPARATUS AND METHOD FOR TELEVISION VIEWER INTEREST EXPRESSION IN ADVERTISER GOODS AND SERVICES

FIELD OF THE INVENTION

The present invention is related to products which allow a television viewer to express an interest in advertised goods and/or services. The present invention also relates to products that allow companies to identify potential customers who are interested in obtaining additional information about a product.

BACKGROUND OF THE INVENTION

Advertisers have traditionally pursued television advertising by transmitting messages to the viewers' televisions and evaluating the effectiveness of the advertising through polls and surveys. This method of evaluation was necessary because traditional broadcast and cable transmission methods were limited to one-way communication. In other words, traditional broadcast and cable mechanisms allow for transmission of a television signal from the source to the destination, but did not allow for an alternative television signal to be transmitted from the destination back to the source.

Recently, advancements in cable signal transmission technology have allowed for transmission of a communications signal from a source to a destination as well as a separate, simultaneous communications signal from the destination back to the source. Perhaps the most widely used example of this bi-directional communications technology is in cable modems. This bi-directional communications technology is also used when ordering pay-per-view movies through on-screen commands via a digital cable decoding box. Similar bi-directional communications technology also exists for multiple communication paths over telephone lines (i.e. DSL). Despite these recent advances in communications technology, advertisers continue to advertise to television viewers in the same manner they have used for the past fifty years. Viewer interaction with the advertisers would be a much more efficient method of advertising. Therefore, a need exists for an apparatus and method of advertising to television viewers which allows the viewer to interact with the advertisement.

A number of different types of interactive cable television systems exist. FIG. 1 is an illustration of the hardware typically used to implement these systems. In FIG. 1, the viewer 20 communicates with the cable box 26 via a remote control 22. Remote control transmission means are well known in the art and include infrared, ultrasonic, wired, and RF signaling. The cable box 26 is connected to the cable provider 30 via a cable network 28. The cable box 26 displays output on the screen of the television 24. Many alternate embodiments of the hardware in FIG. 1 are available including televisions with internal cable boxes and Video Cassette Recorders (VCRs) or Digital Video Disc (DVD) players with internal cable boxes. Other alternate embodiments substitute a pointer, keyboard, mouse, or other viewer input device for the remote control 22. The term cable provider as used herein also includes satellite television providers. Additionally, the cable network 28 may be either wireless or wired, including coaxial and optical cables.

The prior art discloses methods in which the viewer previews the television shows that will be available on the various television channels. These programs are the on-screen equivalent of the TV listings in the newspaper or the TV Guide®. While they appear to be interactive, in fact they merely allow the viewer to browse through a large amount of information that is periodically updated. Moreover, this technology does not allow the viewer to transmit his interests or desires back to the cable provider. Therefore, a need exists for a method which allows a viewer to express his interest in a television commercial and communicate that interest back to the advertiser.

The prior art has addressed the need for viewer interaction with advertisements. U.S. Pat. No. 5,774,534 (the '534 patent) entitled "Context-Based Transactions Using Broadcast Advertising" discloses a method in which the viewer can dial a special phone number to order a specific product when the product is advertised. United States Patent Application Publication 2001/0032333 A1 (the '333 application) entitled "Scheduling and Presenting IPG Ads in Conjunction with Programming Ads in a Television Environment" discloses a system that delivers advertisements while a viewer is viewing an interactive programming guide. European Patent Application EP 1 071 287 A2 (also EP 1 071 287 A3, collectively the '287 application) entitled "Television Advertisement Delivery System and Method" discloses a subscription service in which the advertiser pays the viewer's cable fees and the viewer agrees to watch targeted advertisements. What is needed beyond the '534 patent, the '333 application, and the '287 application is a method of allowing the viewer to express interest in an advertised goods and/or services which is implementable over the viewer's television and cable connection.

U.S. Pat. No. 6,178,446 B1 (the '446 patent) entitled "Method and System for Supporting Interactive Commercials Displayed on a Display Device Using a Telephone Network" discloses a subscriber service in which the viewer is able to order additional information regarding a product through a specialized telephone device. The '446 patent is limited in that it requires special equipment and requires implementation over both the telephone and cable connections. What is needed beyond the '446 patent is a method for allowing viewers to express their interest in a product that does require specialized equipment and is implementable over the viewer's cable connection while leaving the viewer's telephone connection available for other uses.

While the prior art has fulfilled some of the needs in the art, it does not disclose a method for the viewer to indicate interest in goods and/or services over the cable system. Consequently, a need still exists for a method for allowing a viewer to express an interest in advertised goods and/or services. Moreover, a need exists for a method for designating how the advertiser will contact the viewer who has expressed the interest in goods and/or services. The need extends to a method for allowing the viewer to request specific types of additional information about the advertised goods and/or services.

SUMMARY OF THE INVENTION

The present invention, which meets the needs stated above, is an apparatus and method for allowing television viewers to express their interest in goods or services advertised on television. Specifically, the present invention is a software program, implementable on a computer, comprised of a Viewer Preference Program, a Viewer Interest Program, and a Viewer Expression Program. The Viewer Expression Program interfaces with the viewer database, the advertiser database, and the cable provider program contained within the computer system of the cable provider. The Viewer Expression Program runs the cable provider program, the Viewer Preference Program, and the Viewer Interest Program. The Viewer Preference Program is run before the viewer watches the commercial or program in which he/she is interested. In the Viewer Preference Program, the viewer inputs the method by which he/she desires the advertiser to contact him. The viewer also indicates the type of information he/she desires to receive from the advertiser. The viewer may also create a viewer profile, which is personal information that will allow the advertiser to send more relevant information to the viewer.

The Viewer Interest Program runs anytime the television is turned on. The viewer may indicate an interest during any commercial or program by pushing a button on the remote control. The remote control signals the Viewer Interest Program, via the cable box, to record the time and channel of interest. The Viewer Interest Program then cross-references the advertisement with the advertiser responsible and automatically sends the requested information to the viewer in the manner specified in the Viewer Preference Program. The Viewer Interest Program notifies the advertiser that additional information has been sent to an interested viewer. The Viewer Interest Program also sends a confirmation message to the viewer and returns to the original commercial or program. In one alternate embodiment, the viewer can indicate how he/she wishes to be contacted at the same time he/she indicates his desire to receive additional information. In a second alternate embodiment, the viewer can create a viewer profile in the Viewer Preference Program and send all or part of the viewer profile to the advertiser. In a third alternate embodiment, the cable box can identify the advertiser instead of the cable provider.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The term "viewer" as used herein means a person, group of people or entity who watches television and/or who seeks information about a product or service. The term "cable provider" as used herein means a company which provides visual or audio media service to a plurality of viewers and includes satellite television services and internet service providers. The term "advertiser" as used herein means a person, group of people or entity that communicates information regarding goods and/or services to others. The term "computer" as used herein means a device comprising at least a memory and a data processor which is used to process information from a source and deliver the information to another source. The term computer includes cable boxes. The term "television" as used herein means a device for displaying a broadcast visual signal. The term television includes computers that display televisions signals on a monitor. The term television also includes wireless display devices.

Figure 1:
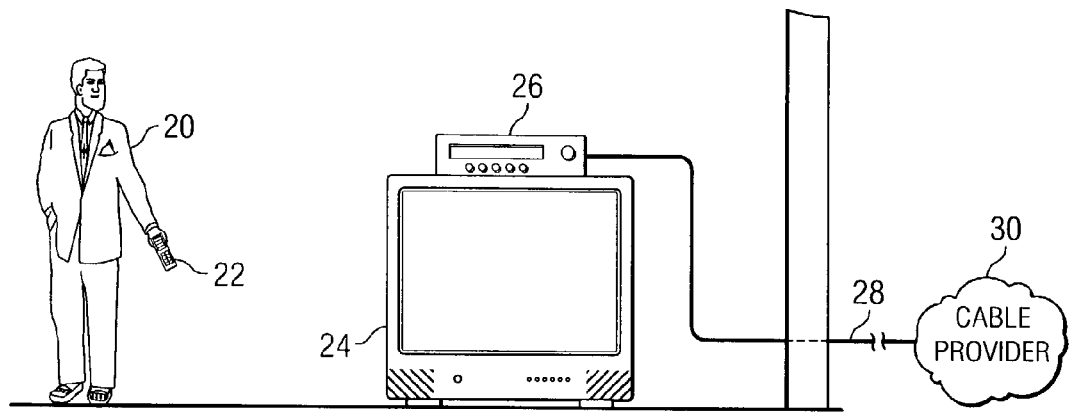
FIG. 1 is an illustration of the prior art hardware used by the viewer to interact with the cable provider.
Figure 2:
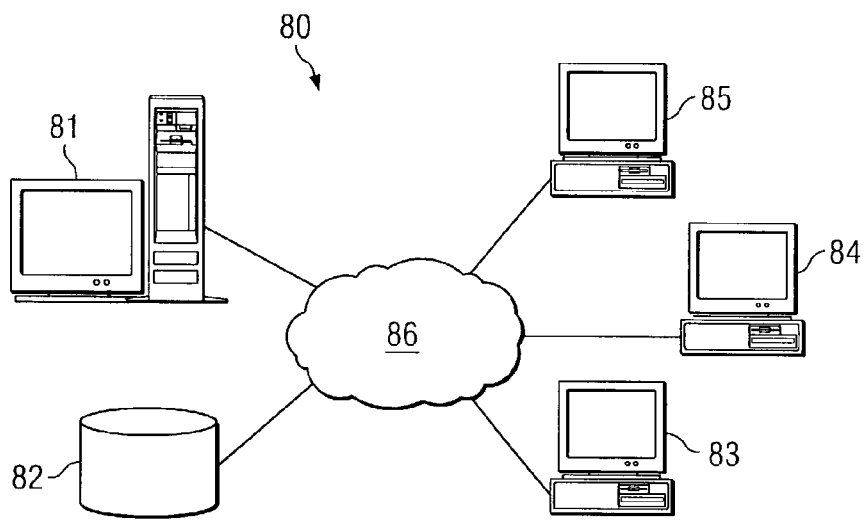
FIG. 2 is an illustration of a computer network used to implement the present invention.

The internal configuration of a computer, including connection and orientation of the processor, memory, and input/output devices, is well known in the art. The present invention is a methodology that can be embodied in a computer program. The computer program embodiment of the present invention is operable upon the hardware used by the prior art. Specifically, as seen in FIG. 1, the viewer 20 enters information into the cable box 26, which is displayed on television 24 and passed onto the cable provider 30. The cable box 26 and the cable provider 30 each contain at least one computer and possibly a network of computers. Alternatively, the cable box 26 may be a computer within the cable provider's computer network. FIG. 2 is an illustration of a computer network 80 associated with the present invention. Computer network 80 comprises local machine 85 electrically coupled to network 86. Local machine 85 is electrically coupled to remote machine 84 and remote machine 83 via network 86. Local machine 85 is also electrically coupled to server 81 and database 82 via network 86. Network 86 may be a simplified network connection such as a local area network (LAN) or may be a larger network such as a wide area network (WAN) or the Internet. Furthermore, computer network 80 depicted in FIG. 2 is intended as a representation of all possible operating systems that may contain the present invention and is not meant as an architectural limitation.

Figure 3:
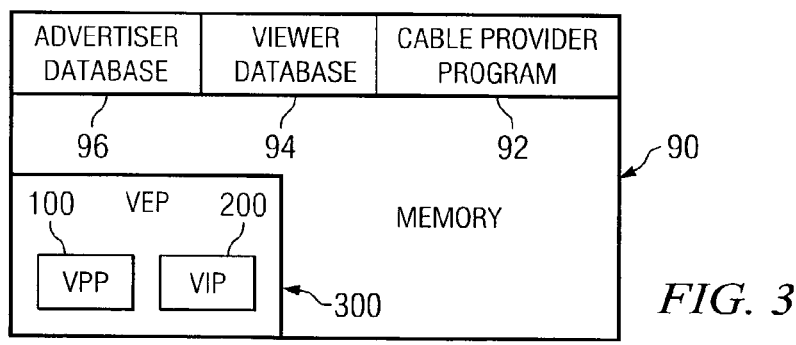
FIG. 3 is an illustration of the computer memory containing the present invention.

Referring to FIG. 3, the methodology of the present invention is implemented on software by Viewer Expression Program (VEP) 300. VEP 300 comprises Viewer Preferences Program (VPP) 100 and Viewer Interest Program (VIP) 200. VPP 100, VIP 200, and VEP 300 described herein can be stored within the memory of a computer on the cable provider's computer network. Alternatively, VPP 100, VIP 200, and VEP 300 can be stored in an external storage device such as a removable disk or a CD-ROM. Memory 90 is illustrative of the memory within the cable provider's computer. The memory 90 also contains viewer database 94, advertiser database 96, and cable provider program 92. The viewer database 94 contains the viewers' names, addresses, contact method, requested information, and other relevant information. The advertiser database 96 contains the advertisers' name, address, and other relevant information as well as a listing of the specific commercials they are airing, the time of those commercials, and the available information about the goods and/or services advertised (i.e. pamphlet available, coupon available, and/or promotional material available). The cable provider program 92 is the computer program used by the cable provider to transmit the cable television signal to the viewer's television. As part of the present invention, the memory 90 can be configured with VPP 100, VIP 200 and/or VEP 300.

In alternative embodiments, VPP 100, VIP 200 and/or VEP 300 can be stored in the memory of the cable box. This configuration allows the processor workload to be distributed across a plurality of processors instead of a single processor. Further configurations of VPP 100, VIP 200 and/or VEP 300 across various memories are known by persons skilled in the art.

Figure 4:
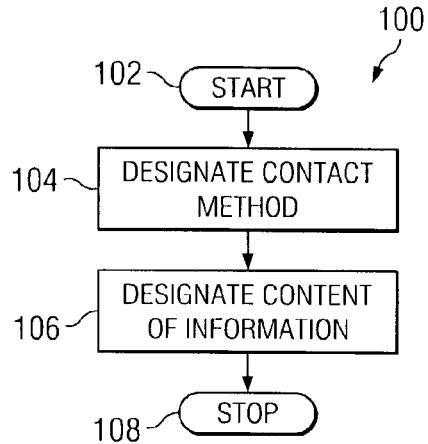
FIG. 4 is a flowchart of the logic of the Viewer Preferences Program (VPP) of the present invention.

In the present invention, the process by which the viewer 20 enters information via the cable box 26 (see FIG. 1) is illustrated in VPP 100 seen in FIG. 4. VPP 100 starts (102) upon the viewers request. The viewer is then prompted to designate a method by which he/she may be contacted (104). The contact method is saved in the viewer database 94. Possible contact methods include: telephone, mail, internet, email, fax, or via an on-screen response system in which the viewer interacts with the cable provider or advertiser via the cable box and television. Persons skilled in the art are aware of other contact methods. The viewer then designates the content of the information he/she would like to receive (106). Possible content types include: a brochure, pamphlet or other sales literature, updates on special promotions, coupons, and/or information when goods can be delivered or a service performed. Persons skilled in the art are aware of other types of content types. When the viewer has selected the contact method and content of information, VPP 100 ends (108).

Figure 5:
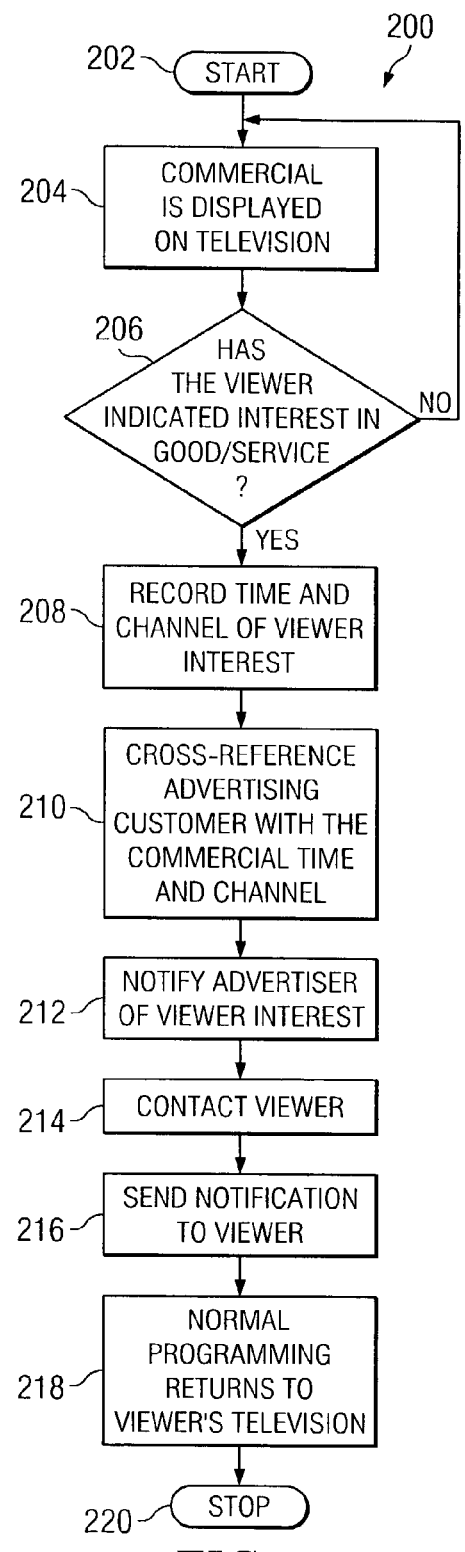
FIG. 5 is a flowchart of the logic of the Viewer Interest Program (VIP) of the present invention.

Referring to FIG. 5, VIP 200 encompasses the concept of indication of viewer interest in a television commercial or television program. VIP 200 starts (202) whenever the television is turned on. A commercial or television program is then displayed on the viewer's television (204). VIP 200 then makes a determination as to whether the viewer has indicated his/her desire to receive additional information regarding the commercial or program (206). The viewer may indicate his desire by pressing a button on the remote control, keyboard, or mouse, or using any other viewer input device known to those skilled in the art. If the viewer does not indicate his/her desire to receive additional information, then VIP 200 returns to step 204 and displays the next commercial or program. If at step 206 VIP 200 determines that the viewer has indicated his/her interest in a good or service in a commercial or program, the cable box or television sends an information request signal to VIP 200. In other words, the cable box notifies VIP 200 that the viewer is interested in the advertised good or service. VIP 200 then records the time and channel associated with the viewer's interest (208). Alternatively, the cable box, the television, or the cable provider can record the time and channel associated with the viewer interest and send this information to VIP 200 and/or the advertiser. VIP 200 then cross-references the time and channel information with the advertiser database 96 (see FIG. 3) to determine which advertiser or sponsor is associated with the commercial or program that the viewer expressed interest in (210). VIP 200 then reviews the viewer preferences within the viewer database 94 (see FIG. 3) for the viewer's preferred contact method and requested content and notifies the advertiser of the viewer's interest (212). VIP 200 then sends the requested information (i.e. a pamphlet, coupon, or promotional materials) to the viewer (214). In other words, VIP 200 contacts the viewer in the method specified by the viewer in step 104 of VPP 100 and sends the information requested in step 106 of the VPP 100. Alternatively, the advertiser can contact the viewer directly. After step 214 or optionally after step 212, VIP 200 sends a confirmation message to the viewer (216). The confirmation message can be sent by the same method expressed in step 104 of the VPP 100 or directly to the viewer in the form of a telephone call or an on-screen "pop-up" message. The VIP 200 then returns to normal programming (218) and VIP 200 ends (220).

Figure 6:
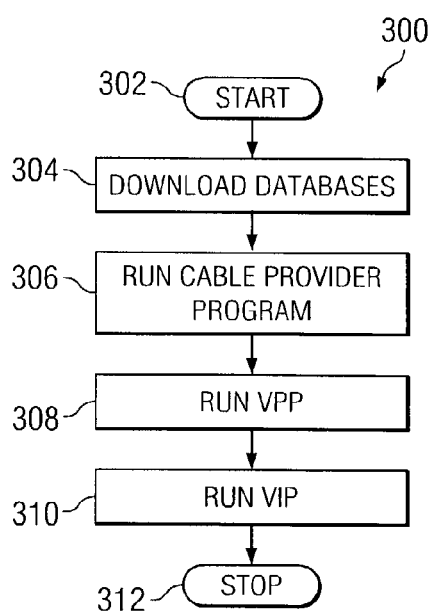
FIG. 6 is a flowchart of the logic of the Viewer Expression Program (VEP) of the present invention.

Referring to FIG. 6, VEP 300 is the computer program by which the present invention interfaces with the cable provider program 92, the viewer database 94, and the advertiser database 96 (see FIG. 3). VEP 300 starts (302) and VEP 300 downloads the viewer database 94 and advertiser database 96 from the cable provider (304). VPP 100 stores the viewer's preferences in viewer database 94. VIP 200 uses the advertiser database 96 to cross-reference the viewer interest with a specific commercial and advertiser. VEP 300 then runs the cable provider program 92 (see FIG. 3), which sends the cable programming to the viewer's television (306). VEP 300 then runs VPP 100 (308). After the viewer has entered the required input in VPP 100, VEP 300 runs VIP 200 (310). Persons skilled in the art are aware of alternative methods for structuring and implementing VEP 300. VEP 300 then stops (312).

The present invention also allows the cable provider or the advertiser to develop a better understanding of what types of goods and services the viewer is interested in. For example, the present invention is configurable to allow the cable provider or the advertiser to record what types of goods and services a viewer has expressed an interest in and the advertiser can develop a viewer profile based on those interests. The cable provider or the advertiser can then send specific programs or commercials to the viewer that are more focused on the viewer's interests.

In an alternative embodiment, the viewer has the option of indicating the advertiser contact method at the same time as he/she indicates his interest in the good or service. Whereas in the preferred embodiment the viewer presses a single button to receive information by a pre-selected contact method, in this alternative embodiment the viewer can press a single button to indicate his desire to receive information via a specific contact method in a single button (i.e. press "1" to send information by email, "2" to send information by mail, etc.) or a combination of buttons (i.e. press viewer interest button+"1" for email, "2" for fax, "3" for telephone, "4" for regular mail, etc.).

In a second alternative embodiment, the viewer enters a viewer profile or viewer personality information in the VPP 100. The viewer profile comprises: age, physical address, email address, sex, marital status, number and age of children, interests, and similar data. Specific profiles can be saved for different member of a household (i.e. the father, mother, and children, or two separate roommates). Upon indication of an interest in a good or service in step 206 of the VIP 200, the viewer has the option of sending part or all of his profile information to the advertiser. This will enable the advertiser to use the user profile as a filter and allow the advertiser to send more relevant or interesting information to the viewer.

In a third alternative embodiment, the television commercial or program signal can be embedded with an advertiser identification tag. In this alternative embodiment, when the viewer expresses his interest in a good or service, VIP 200 is able to automatically identify the advertiser without having to cross-reference the time and channel information to the advertiser database 96. In this embodiment, the time required to contact the advertiser and provide a response back to the viewer is reduced.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A method comprising:
   storing a viewer profile in a viewer database;
   using a cable provider program, transmitting a plurality of cable television signals embedded with an advertising tag to a television of a viewer;
   using a cable box, a program stored in a memory of the cable box, a processor in the cable box, the viewer database, an advertiser database, and a remote device, enabling a television viewer, by pushing one or a combination of buttons, to express an interest in a good or a service related to any program that the viewer is watching from the plurality of cable television signals and at the same time to send the viewer profile to an advertiser associated with a program;

responsive to the viewer pushing the one or a combination of buttons, automatically determining, by the processor in the cable box, the advertiser associated with the program, in which the viewer expressed an interest, by the identifying tag embedded in a cable television signal of the program and sending, by the processor, the viewer preference to the advertiser; and responsive to sending the viewer profile to the advertiser, receiving, by the processor, an information based on the viewer profile from the advertiser via display on the television in which the viewer interacts with the advertiser via the remote device and the display by means of the program and the processor.

2. The method of claim 1, wherein a confirmation message is sent using the on-screen response system.

3. The method of claim 2, wherein the confirmation message is sent via an on-screen pop-up message.

4. An apparatus comprising:

a cable box and a remote device connected to a television and to a cable provider, wherein the cable box transmits a plurality of cable television signals embedded with an advertising tag to the television;

a cable provider program and a viewer database stored in a memory of the cable box;

a viewer preference stored in the viewer database;

wherein the cable provider program is configured to enable a viewer, using the cable box and the remote device, to express an interest in a good or a service related to any program that the viewer is watching from the plurality of cable television signals and at the same time to send the viewer profile to an advertiser associated with a program responsive to the viewer pushing one or a combination of buttons on the remote device, automatically determining, at the cable box, the advertiser associated with a program, in which the viewer expressed an interest, by an identifying tag embedded in a cable television signal of the program and sending the viewer preference to the advertiser; and responsive to sending the viewer profile to the advertiser, receiving an information based on the viewer profile from the advertiser via an on-screen response system in which the viewer interacts with the advertiser via the cable box and television.

5. A computer program product comprising:

a computer readable storage medium that does not comprises a signal, the computer readable storage medium containing a plurality of instructions configured to cause a processor of a cable box to enable a viewer, using the cable box and a remote device, to express an interest in a good or a service related to any program that the viewer is watching from the plurality of cable television signals and at the same time to send the viewer profile to an advertiser associated with a program; responsive to the viewer pushing one or a combination of buttons on the remote device, to automatically determine, at the cable box, the advertiser associated with a program, in which the viewer expressed an interest, by an identifying tag embedded in a cable television signal of the program and to send the viewer preference to the advertiser, and responsive to sending the viewer profile to the advertiser, to receive an information based on the viewer profile from the advertiser via an on-screen response system in which the viewer interacts with the advertiser via the cable box and television.

* * * * *